United States Patent
Howie et al.

(10) Patent No.: US 6,957,166 B1
(45) Date of Patent: Oct. 18, 2005

(54) METHOD AND APPARATUS FOR LOAD RATE MONITORING

(75) Inventors: Wayne L. Howie, Spokane, WA (US); John K. Owens, Spokane, WA (US)

(73) Assignee: The United States of America as represented by the Department of Health and Human Services, Washington, DC (US)

( * ) Notice: Subject to any disclaimer, the term of this patent is extended or adjusted under 35 U.S.C. 154(b) by 0 days.

(21) Appl. No.: 09/673,599

(22) PCT Filed: Apr. 22, 1999

(86) PCT No.: PCT/US99/08844

§ 371 (c)(1), (2), (4) Date: Jan. 2, 2001

(87) PCT Pub. No.: WO99/56003

PCT Pub. Date: Nov. 4, 1999

Related U.S. Application Data (60) Provisional application No. 60/083,678, filed on Apr. 30, 1998.

(51) Int. Cl.[7] ............................................. G01G 11/00
(52) U.S. Cl. ....................................... 702/173; 702/138
(58) Field of Search ................................. 405/288, 302, 405/290, 295; 73/769; 702/173, 15, 138; 299/11; 364/558

(56) References Cited

U.S. PATENT DOCUMENTS

| | | | |
|---|---|---|---|
| 1,737,514 A | 11/1929 | Nikolish | |
| 2,692,924 A | 10/1954 | Williams et al. | |
| 3,137,268 A | 6/1964 | Hornwood | |
| 3,161,174 A | 12/1964 | Harrison | |
| 3,341,843 A | 9/1967 | Walsh | |
| 3,594,773 A | 7/1971 | Conkle et al. | |
| 3,672,174 A | * 6/1972 | Von Hippel | ................ 405/295 |
| 3,844,248 A | 10/1974 | Parker | |
| 3,949,353 A | 4/1976 | Waters et al. | |

(Continued)

FOREIGN PATENT DOCUMENTS

FR 716766 12/1931

OTHER PUBLICATIONS

Feng et al., "Neural Network Model for Real-Time Roof Pressure Prediction in Coal Mines," *Geomechanics Abstracts*, vol. 33, No. 6, pp. 647-653 (abstract only, 1 page), 1996.

(Continued)

*Primary Examiner*—Michael Nghiem
*Assistant Examiner*—Xiuqin Sun
(74) *Attorney, Agent, or Firm*—Klarquist Sparkman, LLP (57) ABSTRACT

A system for real-time monitoring of the dynamic loading rate on support systems used in underground mines and other situations is provided. The load rate monitoring apparatus uses a programmable microcontroller to monitor and calculate the loading rates on the support system from pressure transducers or welded strain gauge instrumentation installed on the support systems. The apparatus is programmed to sequentially activate different color lights and/or audio alarms as the loading rate increases on the support systems. The apparatus is intended for installation with numerous underground support systems used in underground mining to alert miners of dangerous loading conditions, which support systems include longwall shields, mobile roof support (MRS) machines, hydraulic jacks, rock bolts, steel sets, and roof trusses. Intrinsically safe hand-held computers and displays may be used for programming the microcontroller subsystem and optimal load weight indicators include multicolor strobes, light-emitting diodes (LEDs), fluorescent visual indicators and audio alarms.

43 Claims, 7 Drawing Sheets

U.S. PATENT DOCUMENTS

| | | | |
|---|---|---|---|
| 4,070,906 A | | 1/1978 | Rupert et al. |
| 4,097,854 A | | 6/1978 | Black et al. |
| 4,134,270 A | | 1/1979 | Small et al. |
| 4,136,556 A | | 1/1979 | Graham |
| 4,156,236 A | | 5/1979 | Conkle |
| 4,217,849 A | | 8/1980 | Brown et al. |
| 4,318,302 A | | 3/1982 | Choi |
| 4,426,642 A | | 1/1984 | Poffenbarger ............... 340/690 |
| 4,480,480 A | * | 11/1984 | Scott et al. .................... 73/769 |
| 4,581,712 A | * | 4/1986 | Perry et al. .................. 364/558 |
| 4,604,706 A | * | 8/1986 | Fisher et al. ................... 702/15 |
| 4,703,711 A | | 11/1987 | Haynes |
| 4,710,064 A | * | 12/1987 | Stafford et al. ............. 405/290 |
| 4,887,935 A | * | 12/1989 | Koppers et al. ............ 405/302 |
| 4,913,499 A | | 4/1990 | Smart .......................... 299/12 |
| 4,979,780 A | * | 12/1990 | Marion ........................ 299/11 |
| 5,086,651 A | | 2/1992 | Westermo et al. |
| 5,185,595 A | | 2/1993 | Friesen |
| 5,542,788 A | * | 8/1996 | Stankus et al. ............. 405/288 |
| 5,576,494 A | | 11/1996 | Osterberg |
| 5,668,325 A | | 9/1997 | Hart et al. ..................... 73/81 |

OTHER PUBLICATIONS

Jiang et al., "Application of Fuzzy Set Theory in the Evaluation of Roof Categories in Longwall Mining," *Mining Engineering*, vol. 49, No. 3, pp. 53-57 (abstract only, 1 page), 1997.

Park et al., "Analysis of Longwall Shields and Their Interaction with Surrounding Strata in a Deep Coal Mine," *Proceedings of the 11$_{th}$ International Conference on Ground Control in Mining*, Parkville, Aust., pp. 109-116 (abstract only, 1 page), 1992.

Saghafi, "A Computer Model for Prediction of Load Density on Roof Support in a Single Pass Longwall Mining," *Computer Systems in the Australian Mining Industry*, University of Wollongong, New South Wales, pp. 91-98 (citation only, 1 page), Sep. 26-28, 1989.

Follington et al., "Continuous Monitoring of Mechanized Breaker Line Supports to Investigate Roof and Pillar Behavior," *Proceedings of 11$^{th}$ International Conference on Ground Control in Mining*, Parkville, Aust., pp. 345-350 (abstract only, 1 page),1992.

Qian et al., "Monitoring Indices of the Support and Surrounding Strata System on a Longwall Face," *Proceedings of the 11$^{th}$ International Conference on Ground Control in Mining*, Parkville, Aust., (abstract only, 1 page), 1992.

Zhang et al., "Prediction of Intervals of Main Roof Weighting by an Artificial Neural Network," *China Coal Society*, vol. 20, No. 1, pp. 25-28 (abstract only, 1 page), 1995.

Stankus et al., "A New Concept for Roof Support," *Coal Age*, vol. 101, pp. 67-68, Sep. 1996.

Walker, "Longwall Developments: Manufacturers Meet the Challenge," *World Mining Equipment*, vol. 18, Nos. 7-8, pp. 30-32, Jul-Aug., 1994.

Barczak et al., "Critical Load Studies of a Shield Support," *Report of Investigations-United States, Bureau of Mines 9141*, 15 pages (abstract only, 1 page), 1987.

"Digitec Announces Availability of Intelligent Strain Gage/Load Cell Monitor with Instant Peak Capture," News Release Issued by Desco Marketing, Marion, OH, Jul. 27, 1988.

Pearse, "Geotechnical Equipment Review," *World Tunneling and Subsurface Excavation*, pp. 325-329, Oct. 1995.

"The Strain Gage-A Reliable Measurement Tool," *Mechanical Engineering*, pp. 43-471 (abstract only, 1 page), May, 1985.

"Making a Show of Control," *Manufacturing Chemist*, pp. 29-30, Apr. 1994.

"Recent Mine Safety R&D Projects of the U.S. Bureau of Mines," *Engineering & Mining Journal*, vol. 196, No. 11, pp. 26-28, Nov., 1995.

* cited by examiner

METHOD AND APPARATUS FOR LOAD RATE MONITORING

RELATED APPLICATION DATA

This application claims the benefit of Howie et al., U.S. Provisional Patent Application No. 60/083,678, filed Apr. 30, 1998 entitled "Method and Apparatus for Load Rate Monitoring."

BACKGROUND OF THE INVENTION

The invention relates in general to mining safety systems, and particularly to methods and apparatus for monitoring the real-time dynamic loading rate on support systems used in an underground mine to provide warning indications used as an aid in determining when to install additional support systems, and to alert miners of dangerous loading conditions on the support systems during mining operations.

Wooden support columns and posts employed for use in supporting the roof and interior portions of mine shafts provide cracking and crying sounds from to alert miners of dangerous loading conditions during mining. Hydraulic structures and the like, however, provide little or no discernable audible or visual indications to provide warnings of excessive loads or imminent failure. Efforts made to provide alarm indicators and warn miners of danger in the past have typically employed static load indicators which would identify substantial changes and shifts due to abutment pressures from the strata exerted by advancing rock. Such static alarms, often mechanical in nature, provided a condition of either a safe or dangerous condition; however, the alarm apparatus was incapable of identifying changes on a real-time basis so as to warn the miners in advance of dangerous conditions.

Additionally, data collection systems have been developed to monitor static load conditions, providing post processing of measurements to analyze the mine structure. For example, U.S. Pat. No. 4,581,712 to Perry et al. for "Roof Pressure Monitoring System" issued Apr. 8, 1986, describes the use of a number of selected capacitive sensors for monitoring the pressure loading on roof bolts and roof supports throughout a mine, which information is recorded for later computer analysis. Data collection equipment readily available, however, does not inform real-time analysis and warning feedback directly to the miners through the use of sensory indicators.

To better ensure the safety of miners, Mobile Roof Supports (MRSs) were developed by the U.S. Bureau of Mines in the 1980's. Currently, two equipment companies (J.H. Fletcher and Tamrock (formerly Voest-Alpine)) manufacture commercial MRS units. Mobile roof support systems have been used in Australia since 1987, where they replaced wooden posts during full or partial pillar extraction in retreat pillar mining operations. Mobile roof support usage is rapidly increasing in the United States, with approximately 45 coal mines having adopted this relatively new technology with about 160 units currently in use. Guidelines are presently being established for the use of the MRS units, and thus there is also the need for a method to detect imminent roof failure during mining operations. The need for dynamic load rate monitoring is particularly acute because previous methods of using loading on wooden posts and columns, and other indicators, are not longer applicable when mobile roof supports are employed.

It would be desirable, therefore, to provide dynamic load rate monitoring for use with underground mine support systems to provide timely warning indications used as an aid in determining when to install additional support systems and to provide miners of dangerous loading conditions on the support systems on a real-time basis.

SUMMARY OF THE INVENTION

It is an object of the present invention to provide methods and apparatus for load rate monitoring which overcome the disadvantages and problems in the prior art.

It is another object of the invention to provide dynamic load rate monitoring of support systems used in an underground mine to withstand abutment pressure.

It is a further object of the invention to identify changes in the loading rate on the various support systems employed in underground mines.

In the described embodiment, apparatus for monitoring the dynamic loading rate on mobile roof supports provide a load rate monitoring or warning system for use with the mobile roof support machines. This system uses monitoring apparatus employing a dedicated embedded processor to monitor pressure inside hydraulic jacks associated with the mobile roof support. Fluid pressure of the hydraulic jacks is proportional to the internal pressure in the piston head surface area of the hydraulic cylinder. The embedded processor reads changes in cylinder pressure from various load sensing devices using multiplex data acquisition channels, and converts the pressure changes to load rates which are then displayed in a manner which can be observed by all of the miners in the vicinity of the mobile roof support. Preferably the load rates are displayed using three light indicators, green, yellow and red, to indicate the condition of support system (green—OK; yellow—warning of deteriorating condition; and red—immediate hazard).

The methods and apparatus of the described invention provide monitoring of dynamic loading rates on mine support systems by calculating cyclic changes in loading from abutment pressures, which cyclic changes may be compared against previously stored slow-change criteria for appropriate (e.g., green, yellow and red) warning indications in order to sequentially activate different color lights and/or audio alarms as the dynamic loading rate increases on the support systems. Thus, a determination is made by the load rate monitoring controller of the invention to identify the significance of dynamic changing in the loading rates on support systems used in an underground mine to withstand abutment pressures. Accordingly, appropriate sensory indicators are provided on a real-time basis as relating to dynamic load rate conditions.

Briefly summarized, the present invention relates to methods and apparatus for monitoring the dynamic loading rate on support systems used in an underground mine to withstand abutment pressure. At least one load sensing device is adapted to be coupled to one or more of the support systems used in the underground mine. The programmable controller is provided for processing support system loading information received from the at least one load sensing device. A plurality of sensory indicators, such as audible alarms or visual light indicators, are controlled by the programmable controller to provide timely warning indications used as an aid in determining when to install additional support systems and alert miners of dangerous loading conditions on the support systems during mining operations on a real-time basis.

Other objects and advantages of the present invention will become apparent to one of ordinary skill in the art, upon a perusal of the following specification and claims in light of the accompanying drawings.

DETAILED DESCRIPTION OF THE PREFERRED EMBODIMENTS

Figure 1:
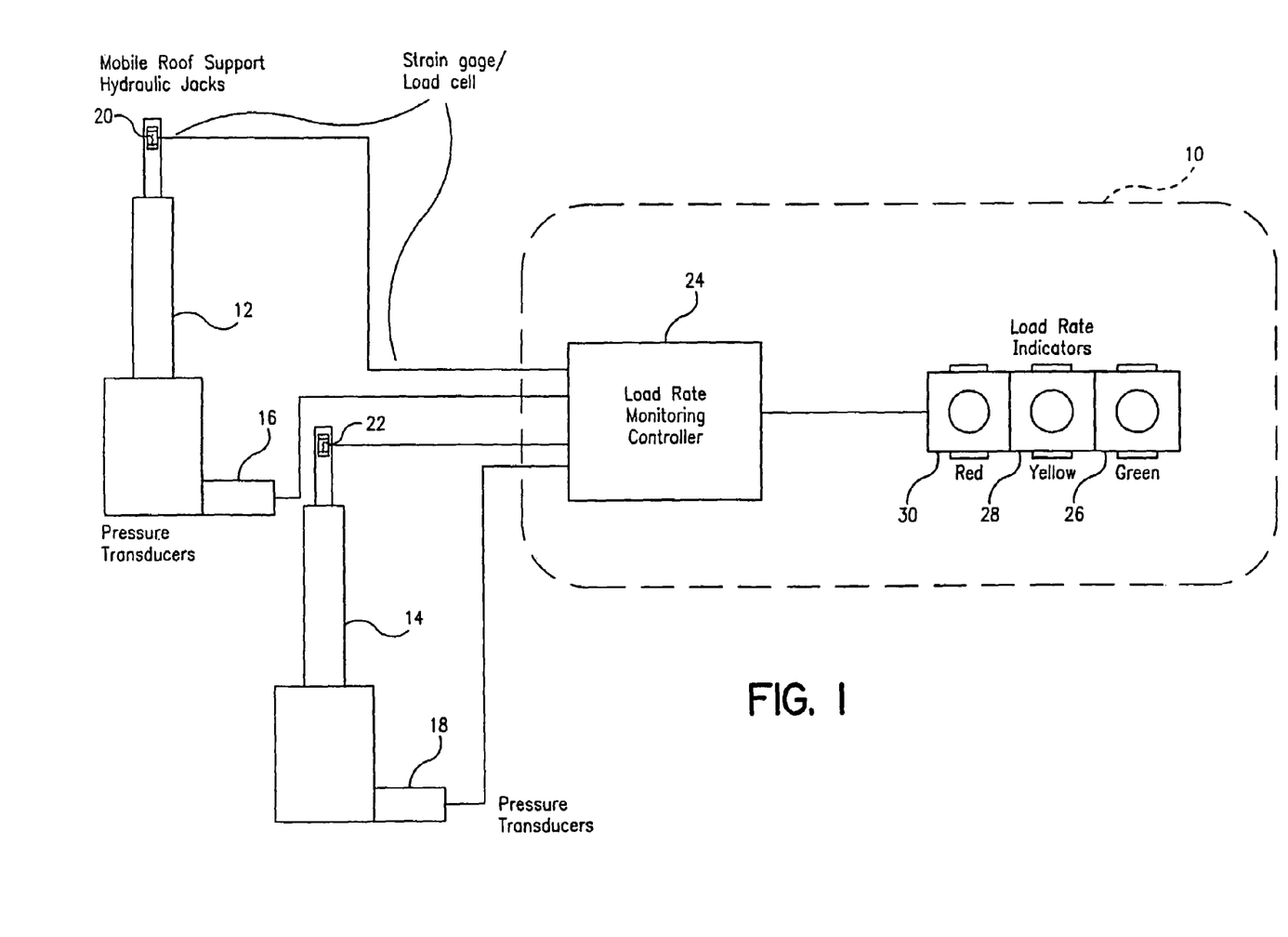
FIG. 1 is a schematic diagram of the mobile roof support load rate monitoring system in accordance with the present invention.

Referring now to the drawings and especially to FIG. 1, an apparatus 10 is shown for monitoring the dynamic loading rate on support systems, e.g., 12 and 14, used in an underground mine to withstand abutment pressure, herein hydraulic jacks associated with a mobile roof support (MRS) unit, as may be provided by J. H. Fletcher or Tamrock, manufactures of commercial MRS units. As shown, two pressure transducers 16 and 18 and/or stress gauge/load cell gauges 20 and 22 are mounted on each mobile roof support (MRS) which are monitored continually by mine personnel to determine loads and loading rates on the machines. This loading information is used by MRS operators to determine when to cease mining operations and/or remove miners and equipment from an area before a dangerous fall occurs. However, the dial gauges can be difficult to read, requiring the MRS operator to approach the MRS to monitor the gauges. Thus, the load rate monitoring (warning) apparatus 10 employing a load rate monitoring controller 24 is used with the MRS to provide visible indicators that can be easily seen by all miners in the vicinity of the MRS unit. The apparatus 10 monitors the dynamic loading on the MRS and activates green 26, amber or yellow 28, and red 30 warning lights mounted on the canopy near the dial gauges. Each light 26, 28 30 represents a different loading rate on the machine. The warning light activation will depend on the actual value of dynamic loading measurement and, thus, will reflect the general safety condition of the MRS unit: green—safe and/or normal operating condition; yellow—caution indicating possible deteriorating conditions; red—unsafe conditions and/or hazards requiring immediate attention and/or evaluation.

The apparatus 10 uses a dedicated embedded processor, herein an Intel 80C31 based microcontroller with an 83C51 control processing unit (CPU), MICRO 485 by Blue Earth Research, to monitor pressure inside four (4) hydraulic jacks associated with the MRS. Loading is proportional to the internal pressure and the surface area of the piston head of the hydraulic cylinder and is determined by the formula:

$$F = A \times P,$$

where F=force in pounds, A=area, in$^2$, and P=pressure, psi. The embedded processor reads changes in cylinder pressure through four multiplexed data acquisition channels of the load rate monitoring controller 24, and converts these pressure changes to load rates which are then displayed by the three load rate indicators, herein LED clusters provided by MTL Incorporated.

Figure 2A:
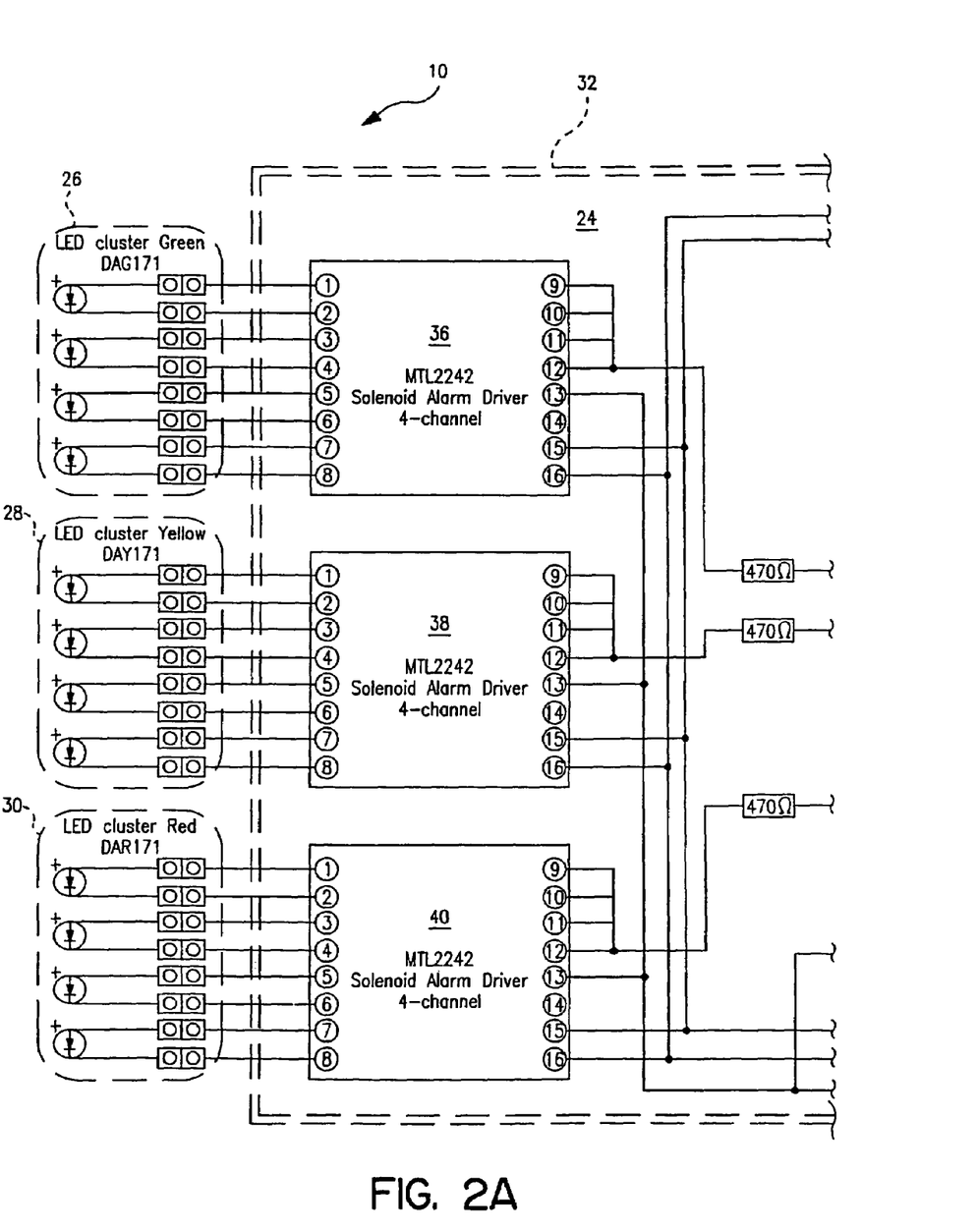
FIGS. 2A, 2B, and 2C are a block diagram of the apparatus for monitoring the dynamic of the apparatus for monitoring the dynamic loading rate on the support systems of FIG. 1.
Figure 2B:
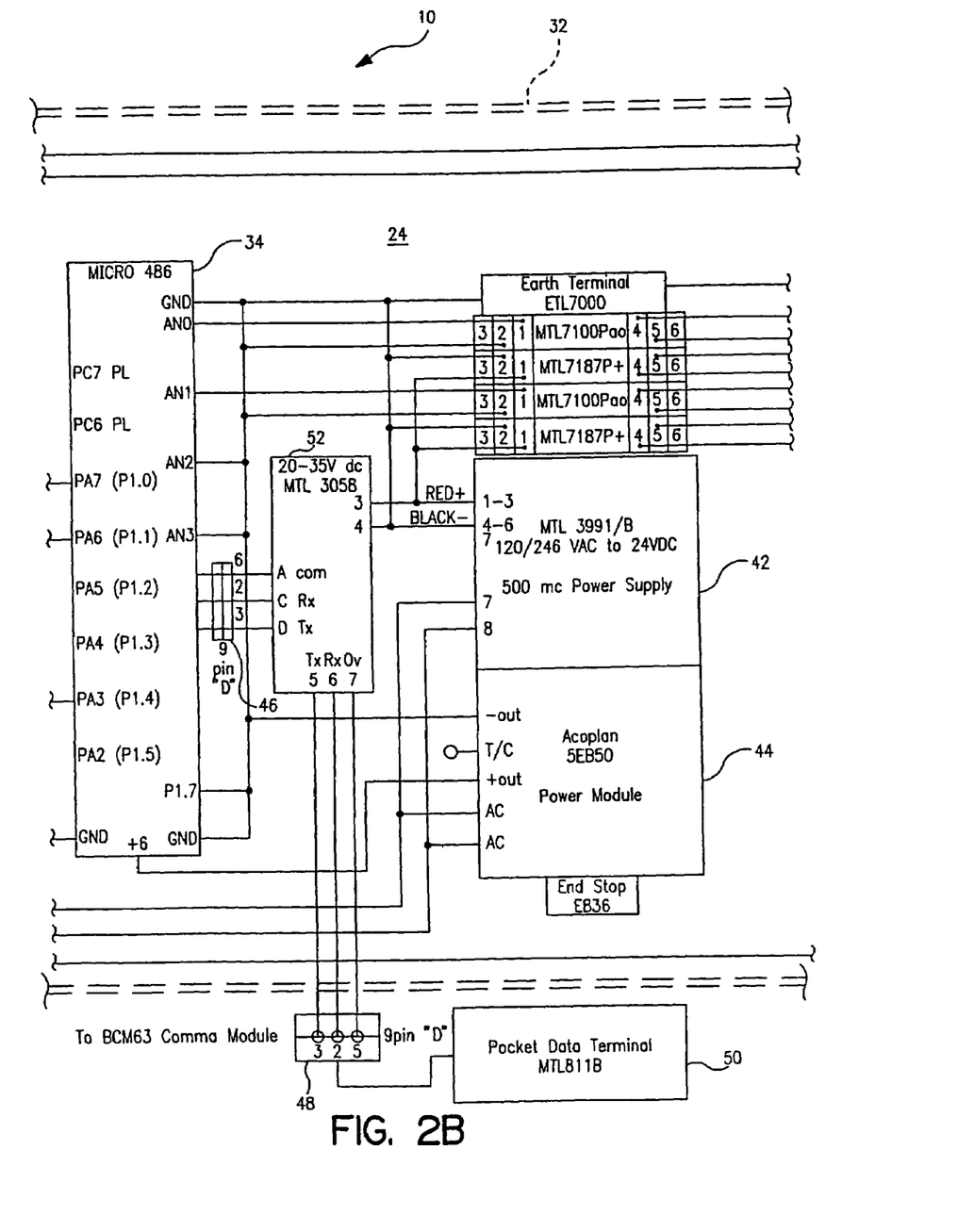
Figure 2C:
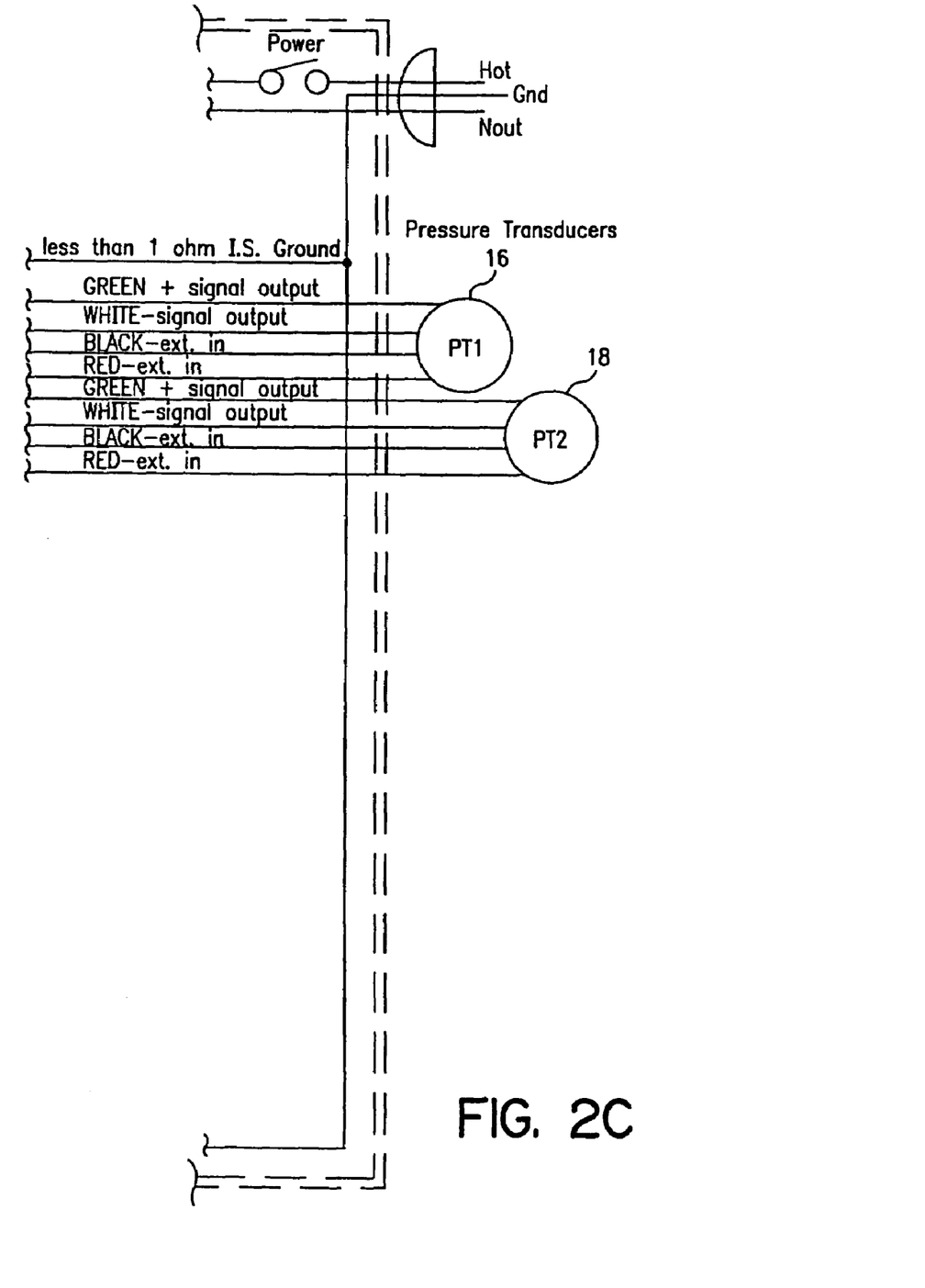

Turning now to FIGS. 2A, 2B and 2C, a schematic block diagram shows the electrical details of the apparatus 10 for monitoring the dynamic loading rate on a mobile roof support using pressure transducers 16 an 18. Apparatus 10 houses the monitoring controller 24 in an explosion-proof enclosure type No. 27122, Certification No. X/P2647-1, provided by Mining Controls Inc. The internal components of the explosion-proof container 32 include the embedded processor microcontroller, MICRO 485, as a programmable controller 34 for controlling solid-state control relays 36, 38, and 40 coupled to green, yellow and red LED clusters 26, 28 and 30, respectively. The solid-state relay controls are 4-channel solenoid/alarm driver modules MTL 2242, each channel being coupled to four light emitting diodes (LEDs) of respective LED clusters, herein green cluster DAG171, yellow cluster DAY171, and red cluster DAR171 also provided by MTL incorporated, as the indicator lights 26, 28 and 30 controlled by drivers 36, 38 and, 40 respectively. Alternative light arrangements, such as multicolor strobes, fluorescent visual indicators and the like, may be provided as sensory indicators, e.g., color visual indicators to miners in the vicinity, which lights may be mounted with magnetic mounting bases. Alternatively, the drivers 36, 38 and 40 may be connected to any alarm devices, such as audible alarms and the like with varying tones or messages provided in accordance with the situation being monitored. The apparatus 10 is powered with low power intrinsically safe power supplies 42 and 44, herein MTL 3991/B 500 milliamp power supply and Acroplan 5EB50 5 volt DC power module, respectively, to satisfy the low power requirements of the apparatus 10. The monitoring controller 24 internal components are provided as being intrinsically safe, and barriers may be provided for the external components.

The apparatus 10 may be communicated through local operation (LO) by an operator for programming the apparatus 10 using the pocket data terminal 50, herein MTL 611B, which is connected to an external 9 pin D-type communication connector 38 to a serial data interface 52, MTL 3058, for serial data communications between the computer terminal 50 and the programmable controller 34 via an external 9-pin D-type connecter 46 between the serial data interface 52 and the programmable controller 34. Accordingly, a user may connect any computer terminal such as the pocket data terminal 50 to the apparatus 10 via the described serial data communications interface for programming the apparatus 10.

The components must be housed in flameproof MSHA approved enclosures when used in hazardous areas. Thus, the external components including the hand-held computer terminal 50 and any associated computer display, low power LED lighting indicator clusters 26, 28 and 30, and the pressure transducers 16 and 18 are provided as intrinsically safe when installed using approved barriers. Optional load rate indicators may provide various visual and audio indicators used in configurations to meet required application features, which indicators may include multicolored strobes, fluorescent visual indicators and audio alarms, which may be obtained as intrinsically safe by design for connection to the drivers 36, 38 and 40 of the apparatus 10.

For purposes of this invention, the term "intrinsically-safe" as applied to the apparatus 10 and its electrical circuitry is intended to mean that any electrical sparking which may occur during normal working conditions is incapable of igniting a flammable gas or vapor (e.g., 5 to 15 volume percent methane in air). In other words, to be "intrinsically-safe" a device or circuit must have both electrical energy (e.g., resistance, capacitance, and inductance)

and thermal energy at levels below that required to ignite a specific hazardous atmosphere (e.g., 5 to 15 volume percent methane in air). Although the monitoring controller 24 (and its electrical circuits) may be sealed against entry of the potentially explosive atmosphere, entry of that atmosphere through failure of the seals, mechanical damage to the device or seals, or the like which allows the potentially explosive atmosphere to contact the electrical circuit would not result in ignition. An intrinsically-safe design is distinguished from an "explosion-proof" design in that, in an explosion-proof device, the potentially explosive atmosphere is prevented from contacting the electrical circuit but, in the event of some failure of the containment system whereby the potentially explosive atmosphere did contact the electrical system, the possibility of ignition would exist. Thus, the present intrinsically-safe apparatus 10 employs LED clusters 26, 28 and 30 rather than, for example, an incandescent bulb (which might be suitable for an explosion-proof device) since, should the glass portion of such an incandescent bulb break, an ignition source (i.e., thermal energy of the filament) would be present. The light-emitting diodes of the present intrinsically-safe apparatus 10, even if broken during operation, would not present such an explosion hazard. Additionally, other sensory indicators which are intrinsically safe by design may be connected to drivers 36, 38 and 40.

Accordingly, the apparatus 10 may be provided as an integrated package which can be retrofitted to existing MRS units for evaluating critical load rate settings for the underground mine support system in order to evaluate its performance. The real-time monitoring provided by the apparatus 10 thus may be used for analyzing dynamic loading rates used on various support systems and equipment used in underground mines. The pressure transducers 16 and 18 are coupled directly to the fluid of a hydraulic system, whereas the strain gauge instrumentation 20 and 22 may be welded directly to or otherwise mounted upon such support systems. Typically, the pressure transducers are provided for measuring between 0 and 5000 psi, but may measure up to 10,000 psi inside the hydraulic cylinders. The welded strain gauge instrumentation typically measures between 0 to 50,000 microstrains ($\mu\epsilon$). Measurements from the pressure transducer and/or strain gauge load sensing devices are thus adapted to be coupled to one or more of the support systems used in the underground mine, and the monitoring apparatus 10 is programmed as described below to calculate the loading rate on such support systems having one or more load sensing devices installed thereon. The apparatus 10 is programmed to sequentially activate different colored lights and/or audio alarms as the loading rate increases on the support systems. As described, the apparatus 10 is intended for installation with numerous underground support systems used in mining applications to alert miners of dangerous loading conditions, which support systems include longwall shields, mobile roof supports (MRS) machines, hydraulic jacks, rock bolts, steel sets, and roof trusses and the like. The described apparatus 10 provides a low-power integrated intrinsically safe mine support monitoring system. When the embodiment described herein for the mobile roof support load rate indicating system, the pressure transducers 16 and 18 are provided as Omegadyne, Inc. PX41T0-5KG5V-MSHA pressure transducers which coupled directly to the hydraulic fluid of the hydraulic cylinder mine support system of mobile roof support machinery.

Figure 3A:
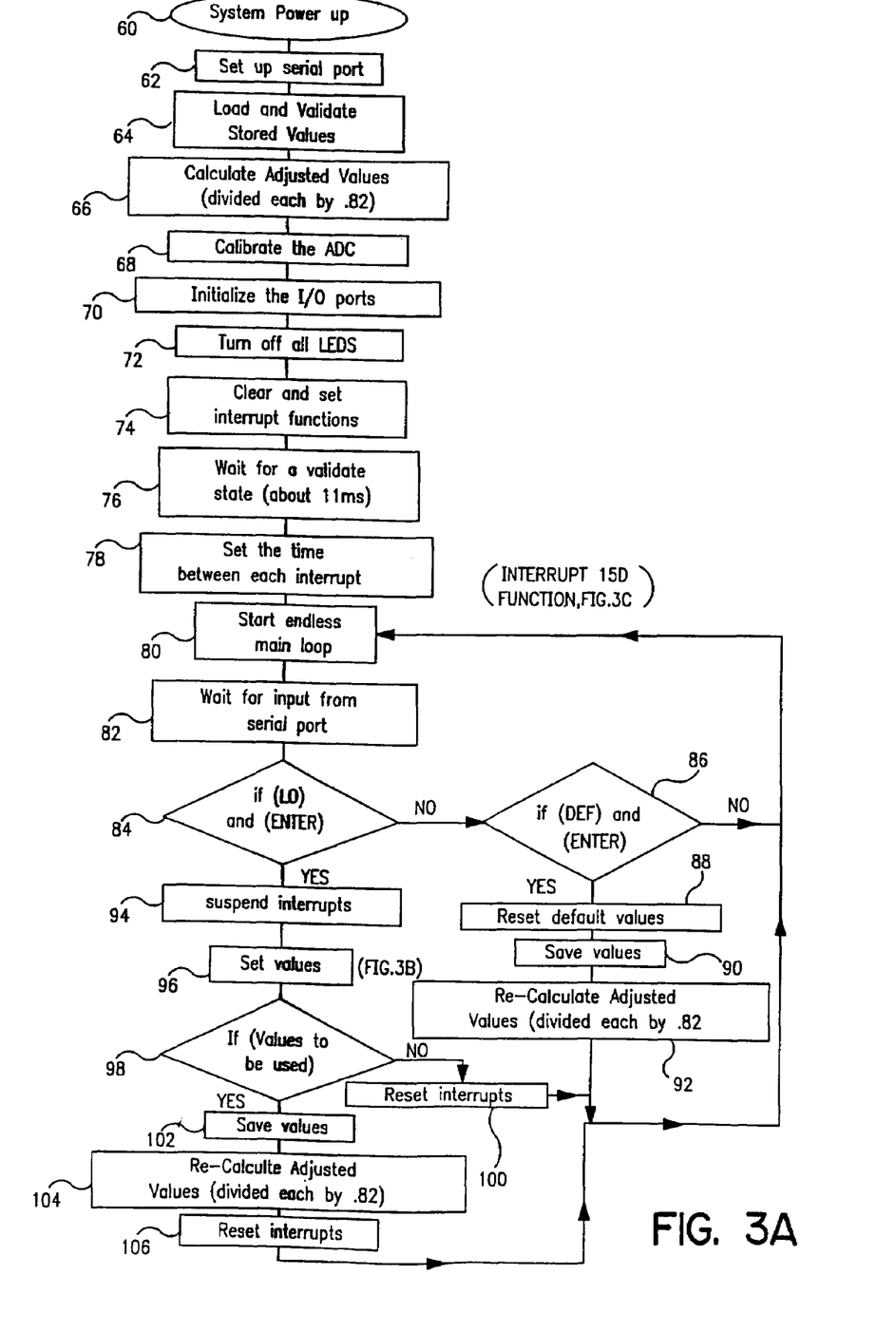
FIGS. 3A, 3B and 3C show a program flow diagram for controlling and programming the described microcontroller embodiment of the invention.

Turning now to the program flow diagrams for the programming of the apparatus 10 in FIGS. 3A, 3B and 3C, system power-up is provided at Step 60 in FIG. 3A, and the serial port is set up for communications at Step 62. At Step 64 stored values are provided for load and validate data, and adjusted values are calculated at Step 66 by dividing the stored values by 0.82 providing adjusted values as 82% of the stored load and validate values. The MICRO 485 programmable controller 34 is a 12 MHz 80C32 based microcontroller having an Intel 83C51 central processing unit (CPU), including multiplexed analog to digital (ADC) input ports which are calibrated at Step 68. The remaining input-output (I/O) ports of the programmable controller 34 are initialized at Step 70, and LED light indicators 26, 28 and 30 are set to with an initial off state at Step 72.

Step 74 clears and sets in the interrupt function, which interrupt function is further described in FIG. 3C below as Interrupt Function 150, which is called approximately every $\frac{1}{16}$th second. At Step 76, the programmable controller 34 waits for a validate state, which should occur after approximately 11 milliseconds to ensure sufficient settling of the apparatus 10 to its initial validate state. Step 78 then sets the time between interrupt for measuring the loading rate, and Step 80 starts an endless main program loop 80, during which load measurement interrupts occur for measuring the loading rates on the underground mine support systems. The interrupt algorithm for measuring the loading rate is described further below in connection with FIG. 3C.

With the pocket data terminal 50 connected via serial communications to apparatus 10 as discussed above, the input from the serial port is observed at Step 82, and Step 84 determines whether programming data is being provided via a local operation (LO) from a user. If local operation is not being provided via the terminal 50, Step 86 determines whether default values have been set for the loading apparatus 10. If default values have been previously set, reset values may not be set and the program flow returns to Step 80. If, however, reset values need to be set, the reset default values are set at Step 88 and the values are saved at Step 90. The adjusted values are then recalculated at Step 92 and program flow continues at Step 80 with the endless main loop during which the apparatus 10 waits for its interrupts for measuring the loading on the support systems.

If it is determined that local operation (LO) is being provided by a user at Step 84, Step 94 suspends interrupts to the apparatus 10 and the set values Step 96 is used for setting the values used in the dynamic load rate monitoring apparatus 10, as described in FIG. 3B below. After the values have been set at Step 96, Step 98 determines if the set values are to be used, and if the values should not be used, interrupts are reset at Step 100 and program flow continues to Step 80. If, however, the values which were programmed during the set value Step 96 are to be used, Step 102 saves the set values and Step 104 recalculates the readjusted values. After having the adjusted values saved, Step 106 resets interrupts and program flow continues at Step 80, as discussed above.

Figure 3B:
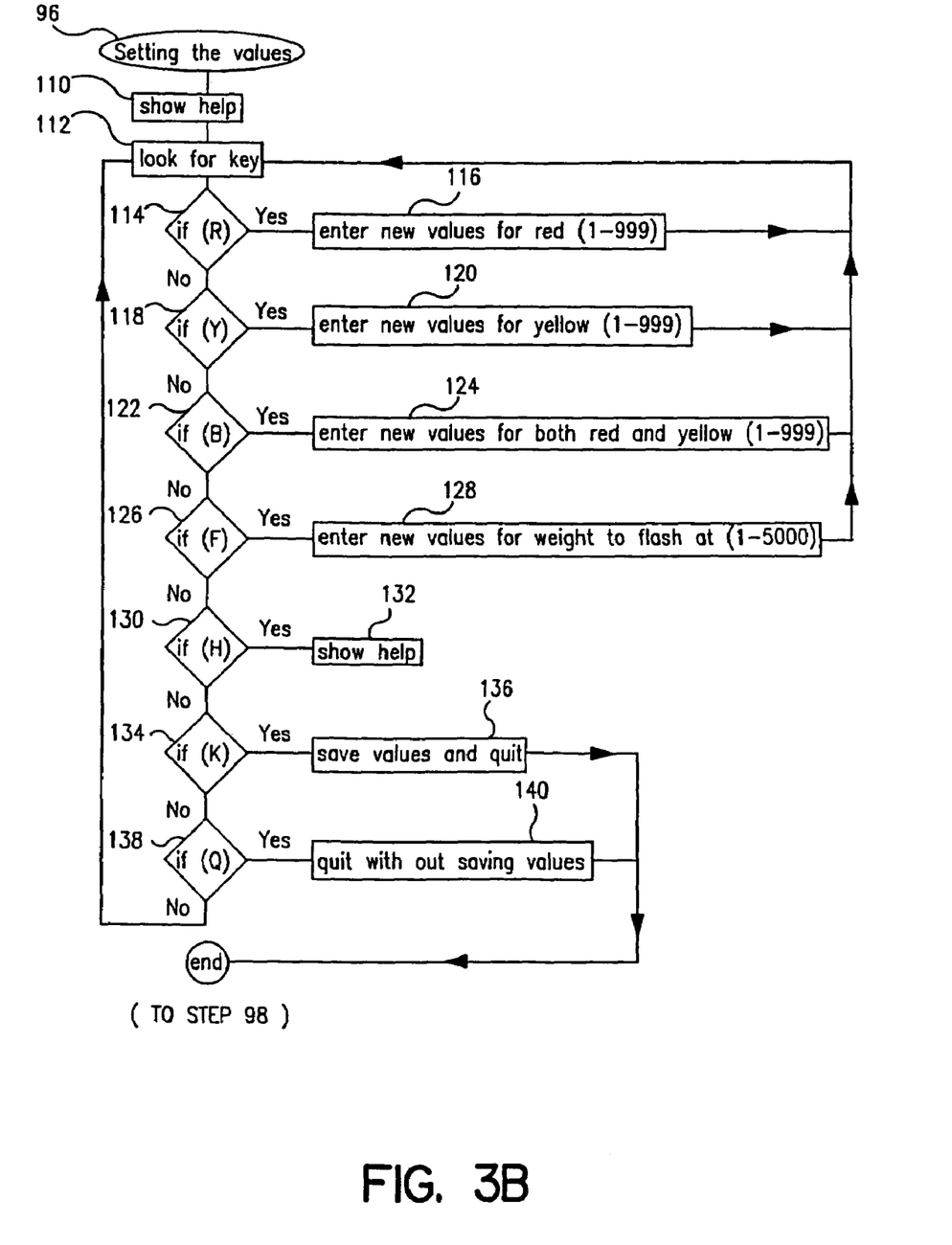

Turning now to FIG. 3B, where the computer terminal 50 is being used by the operator, setting of the values is provided at Step 96, which is facilitated through the use of a HELP screen on the terminal 50 provided at Step 110. Polling of the terminal 50 keys is provided at Step 112, upon receipt of a keyed input, the program flow continues to determine whether one of the "R" "Y" "B" "F" "H" "K" or "Q" keys have been entered by the operator via the terminal 50. Thus, Step 114 upon entry of "R" continues program flow at Step 116 for entering new values for the red light indicator. If at Step 118 the "Y" key is detected, Step 120 is used for entering new values for the yellow light indicator, and if at Step 122 "B" is detected, Step 124 enters new values for both red and yellow indicators.

Step 126 looks for "F" for setting the flash rate of the visual indicators. Step 128 receives new values for the flashing of the visual indicators. If the user of the terminal 50 requires help, the "H" key at Step 130 provides the HELP menu via Show Help block 132. At Step 134, "K" is used to keep the new values set via the terminal 150 to save and quit the data entry input at Step 136. If, however, it is desired that new values not be saved, "Q" detected at Step 138 provides for a quitting without saving the values at Step 140. Upon receipt of a "K" or "Q" QUIT OPERATION at Steps 134 or 138, the set value 96 routine exits to Step 98 of FIG. 3A.

Figure 3C:
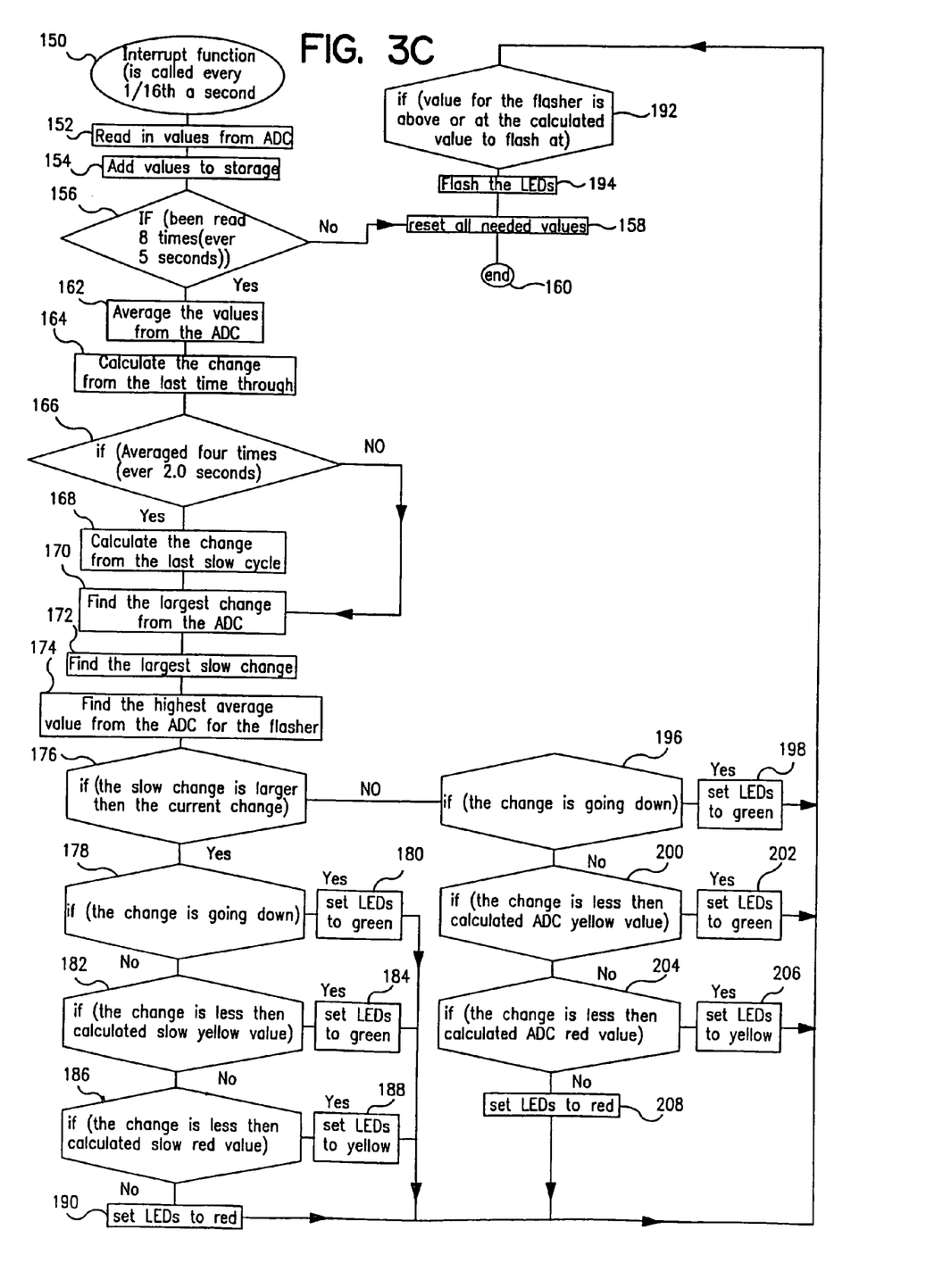

Turning now to FIG. 3C, the interrupt function 150 is illustrated as being called every 1/16th of a second. At Step 152, upon receipt of an interrupt of apparatus 10, the values are read from the analog digital converter (ADC), and the ADC values are added to memory storage at Step 154. Interrupt function 150 then proceeds to determine whether the dynamic loading rate changes observed are significant as follows. At Step 156, if the loading pressure measured by the ADC at Step 152 has increased eight (8) times over its previous value within a half-second interval, the algorithm proceeds to determine the significance of the increased loading. If, however, the loading change is not determined as being significant at Step 156, program flow continues to Step 158 where a reset of all needed values is performed and the end of interrupt is executed at Step 160, returning program flow to the endless main loop of Step 80 in FIG. 3A.

If, however, the change in loading pressure observed at Step 156 is determined as being significant, Step 162 performs an average of the values from the ADC, and Step 164 calculates the change from the last time the interrupt function was executed. At Step 166, the weighted average of four (4) consecutive reads (every two seconds, i.e., four half-second intervals) is provided in a program load to determine if the values have been averaged four times. If previously averaged four times, Step 168 calculates the change from the last slow cycle and Step 170 finds the largest change from the ADC. Step 172 then finds the largest slow change and Step 174 finds the highest average value from the ADC for the flasher. At Step 176, if the slow change criteria is larger than the current observed loading change, program flow continues to Step 178 which determines whether the change is going down. If at Step 178 the loading is observed as going down, the green LED light indicator is activated at Step 180. If the change is not going down, however, Step 182 determines whether the change is less than the calculated slow yellow value, and if the observed change is less than the slow yellow value, the green LED light indicator is also set at Step 184. Step 186 determines whether the red or yellow light indicator should be actuated. Specifically, if the change is less than the calculated slow red value, then Step 188 sets the yellow LED light indicator, otherwise if the change is not less than the calculated slow red value acceptable for changes in loading pressure, Step 190 sets the red LED light indicator and program flow continues at Step 192 where the value for the flasher is obtained or calculated to determine the flash rate, and the appropriate light indicator LEDs are flashed at Step 194 via the appropriate settled driver 36, 38 or 40. Return from the interrupt function 150 is then provided with a reset of all needed values at Step 158 and an end of interrupt execution at 160.

If Step 176 determines that the slow change is not larger than the current change in dynamic loading observed by the apparatus 10, then Step 196 determines if the change is going down. If the change in dynamic loading is decreasing, Step 198 sets the green LED indicator. If, however, the change is not decreasing, Step 200 determines if the change is less than the calculated ADC yellow value, and if the change in dynamic loading is less than the yellow value, Step 202 then sets the green LED indicator. If, however, the change is not less than the calculated yellow value at Step 200, then Step 204 determines if the change is less than the calculated ADC red value. If the change is less than the red value, then Step 206 sets the yellow LED indicator. If, however, the change is not less than the calculated red value, then the red LED indicator is set at Step 208, and program flow continues to obtain the flasher value at Step 192, flashing the appropriated LED indicators at Step 194 and resetting needed values at Step 158 with a return from the interrupt function at Step 160, as discussed above.

Accordingly, it should be appreciated that upon entry of the endless main loop 80 of the program executed by the apparatus 10, calculated and observed dynamic loading changes are compared for providing appropriate warning indications relative to the observed changes in loading pressure. As an integrated package, the described apparatus 10 can be retrofitted to the various support systems described above, with loading histories observed in operation being obtained to determine critical load rate settings for the apparatus 10.

The methods and apparatus of the described invention provide monitoring of dynamic loading rates on mine support systems by calculating cyclic changes in loading from abutment pressures, which cyclic changes may be compared against previously stored slow-change criteria for green, yellow and red warning indications in order to sequentially activate different color lights and/or audio alarms as the dynamic loading rate increases on the support systems. Thus, a determination is made by the load rate monitoring controller of the invention to identify the significance of dynamic changing in the loading rates on support systems used in an underground mine to withstand abutment pressures. Accordingly, appropriate sensory indicators are provided on a real-time basis as relating to dynamic load rate conditions.

While there has been illustrated and described in the preferred embodiment of the present invention, it will be appreciated that modifications may be made further by those skilled in the art, and it is intended that the appended claims cover all those changes and modifications which are followed in the true spirit and scope of the present invention. Although this invention has been described in detail in the context of mining operations, one of ordinary skill in the art will appreciate that the method and device can easily be modified to be used in other industries and/or situations when the temporary support for roof or other structures is required (e.g., constructions and the like).

What is claimed is:

1. An apparatus for monitoring the dynamic loading rate for a mobile roof support unit used in an underground mine to withstand abutment pressure, the apparatus comprising:

at least one load sensing device adapted to be coupled to one or more hydraulic support systems of the mobile roof support unit used in the underground mine;

a programmable controller for processing pressure change information for the one or more hydraulic support systems of the mobile roof support unit, wherein the pressure change information is determined via information received from said at least one load sensing device; and a plurality of sensory indicators located in the vicinity of said at least one load sensing device and controlled by said programmable controller, wherein the plurality of sensory indicators located in the vicinity of said at least one load sensing device indicate loading rate for the mobile roof support unit on a real-time basis during mining operations as determined via the pressure change information for the one or more hydraulic support systems of the mobile roof support unit, wherein indicating loading rate for the one or more of the hydraulic support systems of the mobile roof support unit comprises providing timely warning indications used as an aid in determining when to install additional support systems and alert miners of dangerous loading conditions on the support systems of the mobile roof support unit.

2. An apparatus as recited in claim 1 wherein said load sensing device comprises a pressure transducer.

3. An apparatus as recited in claim 1 wherein said load sensing device comprises a strain gauge.

4. An apparatus as recited in claim 1 wherein said programmable controller comprises an embedded microprocessor.

5. An apparatus as recited in claim 1 wherein said programmable controller monitors loading rate changes on said load sensing device installed on the support systems.

6. An apparatus as recited in claim 5 wherein said programmable controller calculates the loading rates on said load sensing device.

7. An apparatus as recited in claim 5 wherein said plurality of sensory indicators comprise various color visual indicators including multicolor strobes, light-emitting diodes (LEDs), fluorescent visual indicators and the like.

8. An apparatus as recited in claim 7 wherein said programmable controller is programmed to sequentially activate different color lights as the loading rate increases on the support systems.

9. An apparatus as recited in claim 5 wherein said plurality of sensory indicators comprise audible alarm indicators.

10. The apparatus as recited in claim 1 comprising at least one sensory indicator indicating safe conditions in the underground mine.

11. The apparatus of claim 10 wherein the at least one sensory indicator indicating safe conditions in the underground mine comprises a green light.

12. The apparatus of claim 1 wherein the programmable controller comprises a communications interface operable to receive values for controlling the sensory indicators.

13. The apparatus of claim 1 wherein the mobile roof support unit comprises a mobile retreat mining unit with a plurality of hydraulic cylinder support systems, crawler tracks, and a canopy, said mining unit used to withstand the abutment pressure of the underground mine.

14. The apparatus of claim 1 wherein the at least one load sensing device adapted to be coupled to one or more of the support systems of the mobile roof support unit used in the underground mine monitors pressure inside one or more hydraulic jacks associated with the mobile roof support unit.

15. The apparatus of claim 1, wherein at least one of said plurality of sensory indicators indicates a safe condition.

16. The apparatus of claim 15, wherein said at least one of said plurality of sensory indicators indicating a safe condition is a green light.

17. The apparatus of claim 1, wherein each of said plurality of sensory indicators indicates a different loading condition.

18. The apparatus of claim 1, wherein the mobile roof support unit is operable to support a mine roof during pillar extraction carried out in retreat pillar mining operations.

19. The apparatus of claim 1, wherein the mobile roof support unit is operable to support a mine roof during pillar extraction.

20. An apparatus for monitoring dynamic loading rate on for a mobile roof support unit used in an underground mine to withstand abutment pressure, comprising:
at least one load sensing device coupled to one or more hydraulic support systems of the mobile roof support unit;
means for receiving hydraulic pressure information from said at least one load sensing device;
means for determining the loading rate on the support systems using the received hydraulic pressure information; and
means for activating sensory warning indicators located in the vicinity of said at least one load sensing device responsive to said determining means to provide real-time indications of the dynamic loading rate for the mobile roof support unit during mining operations, wherein said real-time indications are used as an aid in determining when to install additional support systems and alert miners of dangerous loading conditions on the support systems of the mobile roof support unit.

21. An apparatus as recited in claim 20 wherein said determining means identifies changes in the loading rate on the support systems.

22. An apparatus as recited in claim 21 further comprising means for sequentially activating different color lights and audio alarms as the loading rate increases on the support systems.

23. The apparatus of claim 20 wherein the means for determining support system loading information is programmable.

24. The apparatus as recited in claim 20 wherein the means to provide timely warning indications used as an aid in determining when to install additional support systems and alert miners of dangerous loading conditions on the support systems during mining operations comprises an indicator indicating safe conditions.

25. The apparatus as recited in claim 24 wherein the indicator indicating safe conditions comprises a green light.

26. The apparatus of claim 20 wherein the means for activating sensory warning indicators is operable to receive a value via a communications interface means, and the value affects under what conditions the sensory warning indicators are activated.

27. The apparatus of claim 20 wherein the means for determining the loading rate on the support systems using the received loading information comprises means to monitor pressure inside one or more hydraulic jacks.

28. The apparatus of claim 20 further comprising means for indicating safe mining conditions.

29. A method of monitoring dynamic loading rate on support systems of a mobile roof support unit used in an underground mine to withstand abutment pressure, the method comprising:
receiving support system loading information from at least one load sensing device coupled to the hydraulic-based support systems of the mobile roof support unit, wherein the support system loading information comprises hydraulic pressure information;
determining the load rate on the support systems using the received loading information; and activating sensory indicators located in the vicinity of said at least one load sensing device to provide timely real-time dynamic loading rate indications as determined via the hydraulic pressure information and used as an aid in determining when to install additional support systems and alert miners of dangerous loading conditions on the support systems of the mobile roof support unit during mining operations.

30. A method as recited in claim 29 wherein determining the load rate on the support systems comprises identifying changes in the loading rate on the support systems.

31. A method as recited in claim 30 wherein said activating step provides warning indications in response to said identifying step.

32. A method as recited in claim 31 comprising the step of sequentially activating different color lights as the loading rate increases on the support systems.

33. The method as recited in claim 29 further comprising: hydraulically coupling at least one of the load sensing devices to one or more of the support systems of the mobile roof support unit during installation.

34. A method as recited in claim 29 further comprising: welding at least one of the load sensing devices onto the support systems during installation.

35. The method of claim 29 wherein the determining is performed by a programmable controller.

36. One or more computer-readable media comprising computer-executable instructions for performing the method of claim 29.

37. The method of claim 29 further comprising setting a value received via a communications interface at a location local to said at least one load sensing device, wherein the value affects activation of one or more of the sensory warning indicators.

38. An apparatus for monitoring dynamic loading rate on support systems of a mobile roof support machine to withstand abutment pressure, the apparatus comprising:
   at least one load sensing device adapted to be coupled to one or more hydraulic support systems of the mobile roof support machine;
   a programmable controller for processing pressure information for the one or more hydraulic support systems of the mobile roof support machine, wherein the pressure information is determined via information received from said at least one load sensing device; and
   at least one sensory indicator located in the vicinity of said at least one load sensing device and controlled by said programmable controller, wherein the at least one sensory indicator located in the vicinity of said at least one load sensing device indicates loading rate on a real-time basis during mining operations as determined via the pressure information for the one or more hydraulic support systems of the mobile roof support machine, wherein indicating loading rate for the one or more of the hydraulic support systems of the mobile roof support machine comprises providing timely warning indications used as an aid in determining when to install additional support systems and alert workers of dangerous loading conditions on the support systems of the mobile roof support machine.

39. The apparatus of claim 38 wherein the programmable controller is operable to set one or more programmable values which help determine when to install additional support systems and alert workers of dangerous loading conditions on the support systems.

40. The apparatus of claim 38 wherein at least one load sensing device adapted to be coupled to one or more of the support systems of the mobile roof support machine comprises a pressure transducer to monitor pressure inside one or more hydraulic jacks associated with the mobile roof support machine.

41. An apparatus for monitoring dynamic loading rate on support systems of a unit, the apparatus comprising:
   at least one load sensing device adapted to be coupled to one or more of the support systems of the unit to monitor pressure inside one or more hydraulic jacks associated with the unit;
   a programmable controller for processing support system loading information received from said at least one load sensing device and determine the dynamic loading rate via the monitored pressure inside the one or more hydraulic jacks associated with the unit; and
   at least one sensory indicator located in the vicinity of said at least one load sensing device and controlled by said programmable controller to alert workers of the dynamic loading rate conditions on the support systems of the unit on a real-time basis as determined via the monitored pressure inside the one or more hydraulic jacks associated with the unit.

42. The apparatus of claim 41 wherein the programmable controller is operable to set programmable values based at least on part on the loading conditions on the support systems.

43. An apparatus for monitoring dynamic loading rate on hydraulic-jack-based support systems of a mobile roof support unit used in an underground mine to withstand abutment pressure, wherein the mobile roof support unit is operable to support a mine roof during retreat pillar mining operations via one or more hydraulic jacks, the apparatus comprising:
   at least one load sensing device adapted to be coupled to one or more of the hydraulic-jack-based support systems of the mobile roof support unit used in the underground mine and operable to measure measurements of hydraulic pressure within the one or more hydraulic jacks, wherein the mobile roof support unit is operable to support a mine roof during retreat pillar mining operations;
   a programmable controller for processing support system loading information received from said at least one load sensing device; and
   a plurality of sensory indicators located in the vicinity of said at least one load sensing device and controlled by said programmable controller to provide timely warning indications of the loading rate on the hydraulic-jack-based support systems of the mobile roof support unit based on the measurements of the hydraulic pressure within the one or more hydraulic jacks, wherein the indications are used as an aid in determining when to install additional support systems and alert miners of dangerous loading conditions on the support systems of the mobile roof support unit during mining operations on a real-time basis, wherein the mobile roof support unit is operable to support a mine roof during retreat pillar mining operations.

* * * * *

UNITED STATES PATENT AND TRADEMARK OFFICE
CERTIFICATE OF CORRECTION

PATENT NO. : 6,957,166 B1
DATED : October 18, 2005
INVENTOR(S) : Howie et al.

It is certified that error appears in the above-identified patent and that said Letters Patent is hereby corrected as shown below:

Column 1,
Line 22, "from to" should read -- to --.

Column 2,
Line 3, "provide" should read -- inform --.

Column 3,
Lines 11-12, "dynamic of the apparatus for monitoring the dynamic loading" should read -- dynamic loading rate --.
Line 44, "28 30" should read -- 28, and 30 --.

Column 5,
Line 62, "which coupled" should read -- which are coupled --.

Column 6,
Line 12, "to with" should read -- to --.

Column 10,
Lines 7-8, "on for" should read -- for --.

Signed and Sealed this

Twenty-first Day of March, 2006

JON W. DUDAS
*Director of the United States Patent and Trademark Office*